April 22, 1941. W. B. FAGEOL 2,239,089
REINFORCED VEHICLE BODY CONSTRUCTION
Filed Dec. 29, 1938 4 Sheets-Sheet 1

Inventor
William B. Fageol
By Strauch & Hoffman
Attorneys

Inventor
William B. Fageol
By Strauch & Hoffman
Attorneys

April 22, 1941.　　　W. B. FAGEOL　　　2,239,089
REINFORCED VEHICLE BODY CONSTRUCTION
Filed Dec. 29, 1938　　　4 Sheets-Sheet 4
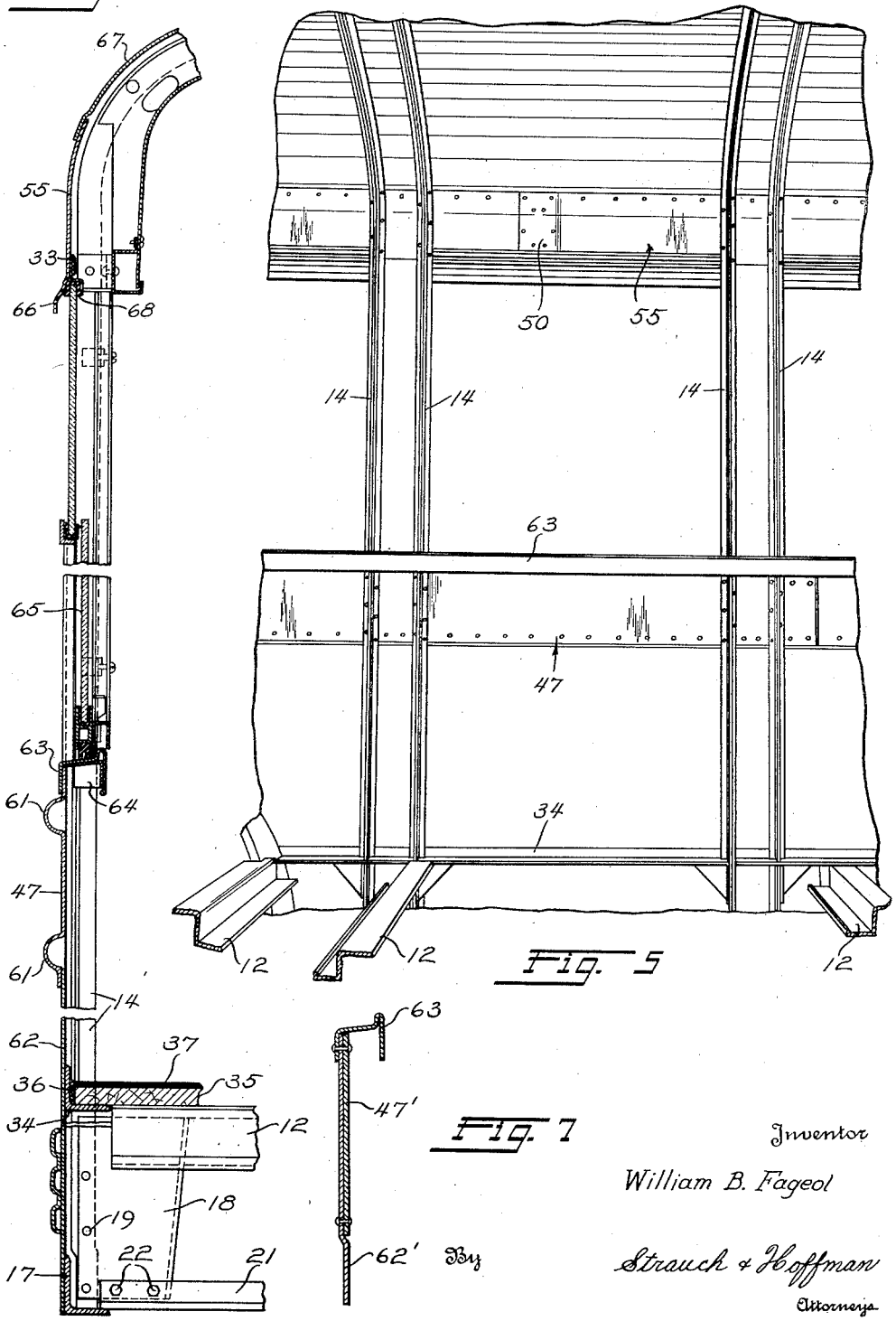
Inventor
William B. Fageol
By Strauch & Hoffman
Attorneys Patented Apr. 22, 1941

2,239,089

UNITED STATES PATENT OFFICE 2,239,089

REINFORCED VEHICLE BODY CONSTRUCTION

William B. Fageol, Kent, Ohio, assignor to Twin Coach Company, Kent, Ohio, a corporation of Delaware Application December 29, 1938, Serial No. 248,332

6 Claims. (Cl. 296—28)

This invention relates to vehicle construction and is more concerned with structural arrangements for strengthening the vehicle body frame.

The invention is applicable to any type of vehicle body where it is desirable to build in rigid structural members for the purpose of strengthening the body, but it is especially applicable to vehicles of the so-called chassisless construction wherein the chassis and frame members are all relatively light, strong structural members, usually of steel, which are integrally united as by welding or riveting.

The invention will hereinafter be described as applied to a passenger carrying vehicle or bus of the chassisless type wherein the motor is supported by the structural members at the rear of the vehicle. In vehicles of this type in general use today, the vehicle floor rests upon the horizontal body base frame whose structural members are somewhat stronger than those in the upper parts of the body because the base frame is attached to the running gear and must support the weight of the motor and other equipment, as well as absorb shock loading from roads.

The vertical body frame members are usually light structural steel members generally of T-shape to gain as much rigidity as possible while at the same time provide flanges for mounting the body panels. These vertical body frame members extend upwardly from the base frame at each side of the body and slope inwardly and upwardly to provide roof support braces, and are usually rigidly interconnected by suitable roof beams and braces.

In these present day buses, relatively few structural members extend longitudinally of the body and it has been necessary to strengthen the body frame construction by the use of vertical gusset plates and interior panels. These gusset plates or panels extend between adjoining vertical T-shape members and are usually riveted thereto so that the body frame comprises a plurality of integrally united light T-shaped members strengthened by a series of separate panels extending between immediately adjacent members and riveted thereto.

These buses are usually kept in practically constant use and are subjected to all kinds of stresses due to rough city streets and other road irregularities. Many of these stresses are transmitted to the structural frame members where they tend to twist and bend the body frame. These stresses are usually unevenly distributed and often cause distortion of the frame members, shearing of the riveted joints and other attendant damage.

Furthermore, various stresses due to the weight of the heavy rear motor as the vehicle is running along a roadway are transmitted to the body frame members and some difficulty has been experienced in these vehicles due to breakage of the frame members, especially adjacent the motor support.

With the above defects of the prior art in mind, it is a major object of the present invention to provide a novel vehicle body frame construction wherein the structural members of the frame are interconnected and reinforced in such a manner as to distribute the various stresses and strains incident to normal operation of the vehicle substantially evenly and uniformly throughout the body frame.

It is a further object of the invention to provide a novel vehicle body frame comprising a plurality of integrally united light structural members reinforced by relatively rigid girder means. Preferably the invention is employed in vehicles of the chassisless type.

A further object of the invention is to provide a novel vehicle body frame construction comprising a plurality of light vertical structural members which are interconnected by a rigid reinforcing band or strip means which extends substantially entirely around the vehicle body. This strip means may be a single strip of metal or may comprise a series of separate strips having their adjacent ends rigidly connected so as to be the equivalent of a single integral strip.

It is a further object of the invention to provide a novel vehicle body construction comprising a plurality of light structural members which are interconnected and reinforced by a plurality of longitudinal flat strips extending in generally parallel relation above and below the upper and lower window opening edges respectively.

A further object of the invention is to provide a novel longitudinal vehicle body reinforcing girder which extends along the body adjacent the upper edges of the side window openings and is formed as a water shed for the windows.

A further object of the invention is to provide novel vehicle body construction wherein the body frame members are reinforced by longitudinal girders and the body panels are secured to the girders and the frame members.

It is a further object of the invention to provide a novel vehicle body construction wherein the body frame is reinforced by a longitudinal girder which serves as substantially a continuation of the body panelling and supports the window ledge strip.

Further objects of the invention will presently appear as the description proceeds in connection with the appended claims and the annexed drawings in which Figure 1 is a perspective, partly in section, taken from a point within the front end of a partially constructed vehicle body looking toward the rear of the vehicle illustrating the body frame construction and the reinforcing girders.

Figure 5 is a perspective partial view, partly in section illustrating the reinforced body construction substantially amidships of the vehicle.

Figure 6 is an end elevation in section of a side wall and portion of the roof and flooring of a vehicle illustrating a preferred embodiment of the invention wherein the reinforcing girders are rigid steel strips only partially lapped by the vehicle body panels.

Figure 7 is a fragmentary view of a further embodiment illustrating the completely overlying relation of the reinforcing girder and the body panel when a strip of metal is used as the reinforcing girder.

Figure 1:
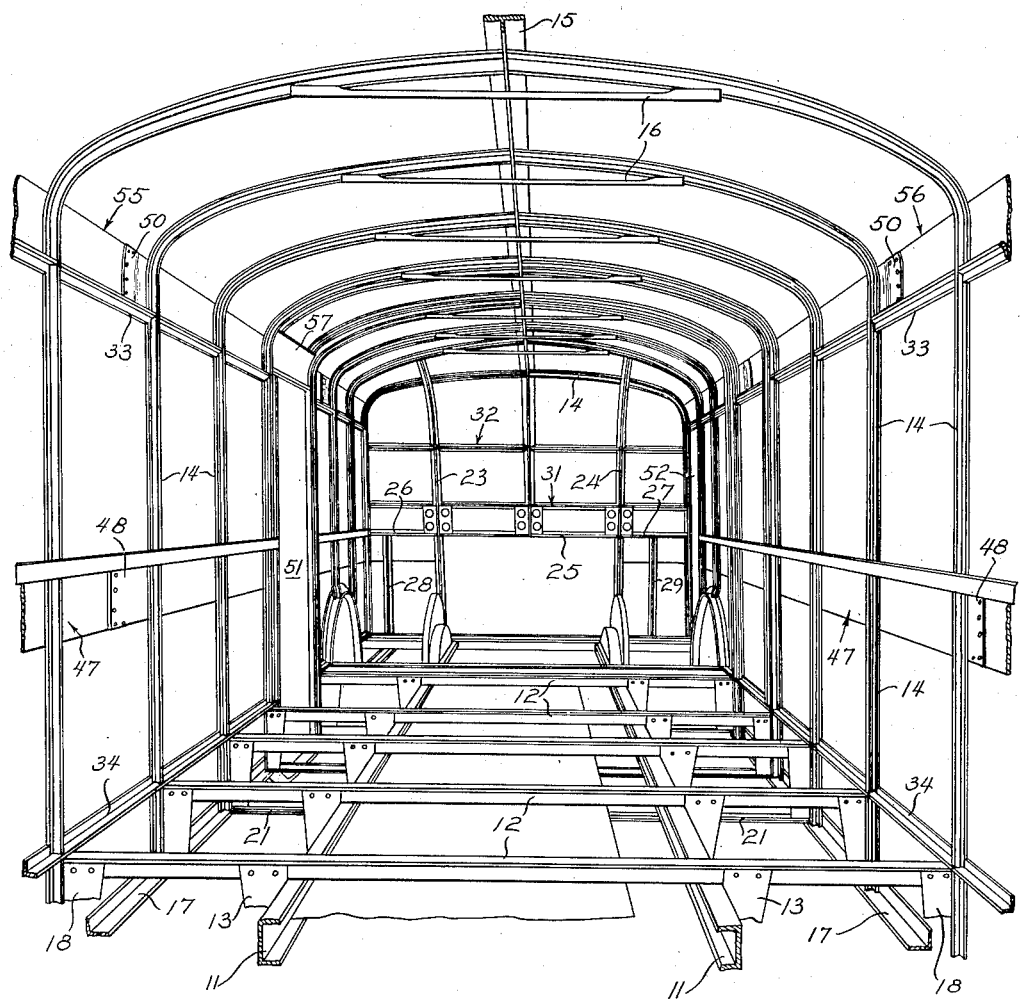
Figure 2:
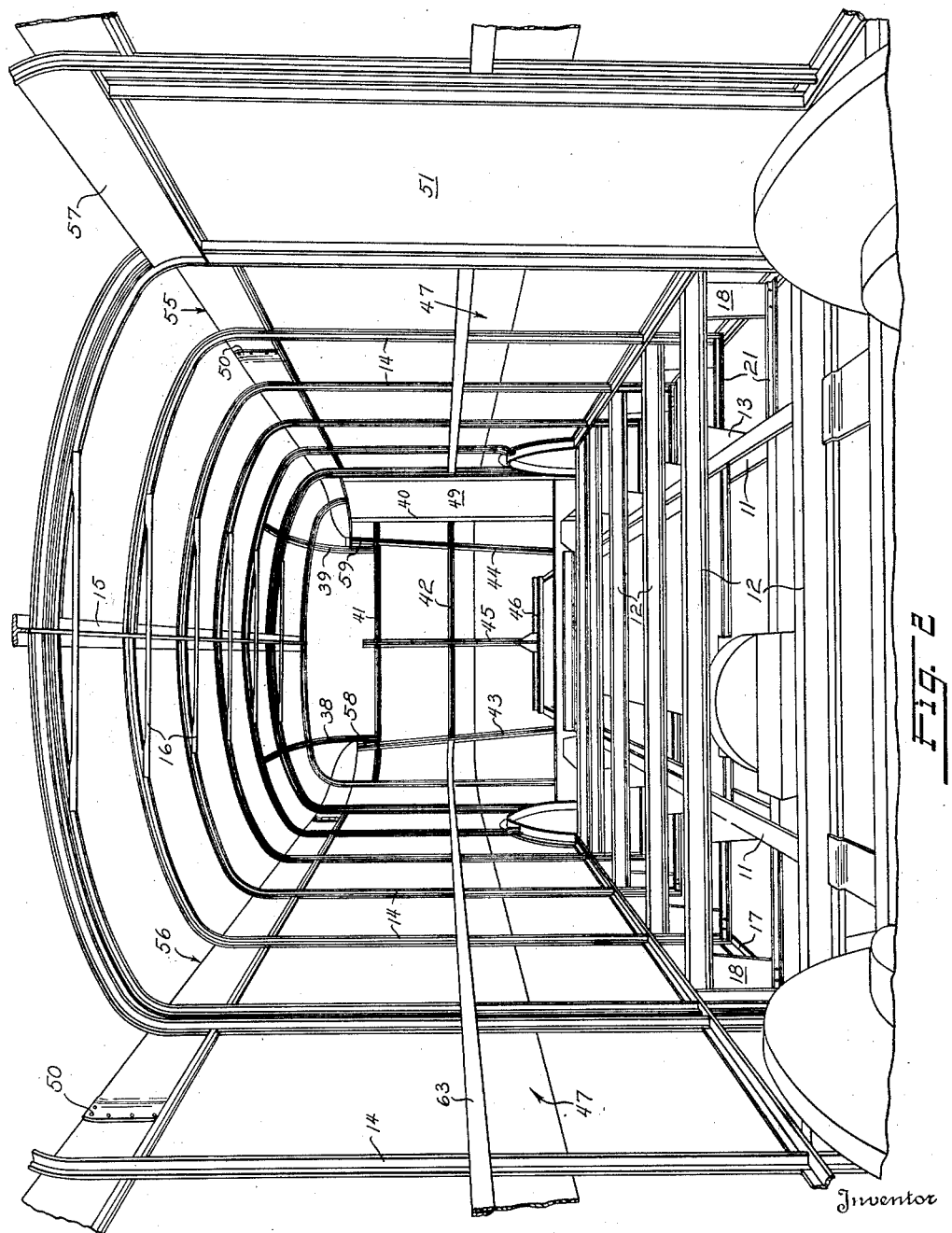
Figure 2 is a perspective, partly in section, taken from a point within the rear end of a partially constructed vehicle body looking toward the front of the vehicle illustrating further the body frame construction and reinforcing girders.

Referring to Figures 1 and 2, the horizontal base frame of the vehicle body comprises longitudinal channels 11 upon which rest a plurality of spaced transverse beams 12. Channels 11 and beams 12 are suitably rigidly fastened together as by rivets and suitable flanged interconnecting brackets 13 riveted thereto.

A plurality of light structural members 14, which are generally T-shaped in cross section, extend upwardly adjacent the ends of beams 12 and are curved inwardly at their upper ends to define the roof contour, and aligned pairs of these members 14 are secured as by welding or riveting at opposite sides of a central longitudinal roof beam 15. A roof brace comprising a member 16 is bolted or otherwise fastened at its opposite ends to each pair of aligned members 14. Aligned pairs of members 14 may be spaced at any desired distance along the body as indicated in Figures 1, 2 and 5.

As shown in Figure 6, each member 14 terminates below the base frame and is secured in a suitable manner, as by welding, or riveting to a skirt angle 17 which extends entirely around the vehicle, being interrupted and offset at the doorways and the wheel housings only.

A plate 18 is secured rigidly upon the lower end of each member 14, as by rivets 19, and the opposite ends of beams 12 are riveted or otherwise suitably secured to plates 18 as illustrated in Figure 6. A transverse tie rod 21, preferably shaped as an angle, extends substantially parallel to each beam 12 and is bolted or riveted at its opposite ends at 22 to plates 18.

A pair of light T-shaped structural members 23 and 24 extend longitudinally across the rear roof and upper side defining frame members 20 and slope downwardly and rearwardly to the angle 17. Roof beam 15 extends rearwardly generally parallel with members 23 and 24 and is secured at its lower end to a horizontal cross bar 25 which extends between members 23 and 24.

Frame elements 26 and 27 extend, in horizontal alignment with bar 25, from members 23 and 24 respectively to adjacent lower ends of frame members 20, and elements 26 and 27 are connected to angle 17 by vertical frame elements 28 and 29 respectively as illustrated in Figure 1. Two vertically spaced series of horizontal frame elements indicated at 31 and 32 extend in generally parallel relation between opposite legs of the rear frame members 20 and traverse the rear vertical frame members 23, 24 and 15.

All of the horizontal and vertical frame members and elements 14, 15, 20, 23, 24, 25, 26, 27, 28, 29, 31 and 32 are preferably rigidly and integrally united by welding or riveting to provide a skeleton frame which defines the contour of the rear end of the vehicle. Suitable gusset plates are provided for strengthening the interconnection between each frame member and element as desired.

Vertical frame members 15, 23 and 24 and horizontal frame elements 31 and 32 cooperate to define the two central rear window openings. Vertical frame members 23 and 24 define the lateral edges of the rear motor compartment opening whose upper edge is defined by cross bar 25.

A series of light structural elements 33 extend horizontally between adjacent vertical side frame elements 14 to define the upper edges of the side window openings and these elements 33 are rigidly secured as by welding or riveting to the vertical frame members.

At the vehicle floor level, a series of light angle members 34 (Figures 1 and 6) extend between adjacent vertical side frame members 14 and are secured rigidly thereto, as by welding or riveting. As illustrated in Figure 6, the vehicle flooring 35 is supported by beams 12 and angles 34 and is provided with weatherproof caulking 36 at angles 34. The usual floor covering is designated at 37.

At the front end of the vehicle body, a pair of light structural members 38 and 39 extend along the roof substantially in alignment with rear frame members 23 and 24 respectively and, after traversing the three foremost vertical frame members 14, slope forwardly and downwardly to a horizontal frame member 41 which traverses the front of the body frame from the foremost vertical frame member 14 to the front edge 40 of the front side doorway 49 as illustrated in Figure 2.

A second horizontal frame member 42 extends across the front of the body parallel and coextensive with member 41 and these members define the bottom and top edges respectively of the front window openings. A pair of vertical frame members 43 and 44 traverse members 41 and 42 at opposite front corners of the body and are secured in a suitable manner (not shown) to angle 17 where it traverses the front end of the body. A central front frame member 45 traverses members 41 and 42 and terminates in a horizontal cross member 46 which is connected by a suitable means (not shown) to angle 17.

All of the above described front frame members 14, 38, 39, 41, 42, 43, 44, 45, and 46, the angle 17 and the element 40 defining the front doorway edge are preferably rigidly united as by welding or riveting.

The above described body frame structure, comprising the rigidly riveted base frame arrangements and the integrally united and welded or riveted body frame members and elements, defines the skeleton upon which the other vehicle parts are built and does not differ materially from the body frame skeleton which is used in many present day vehicles.

However, as above stated, those of the present day vehicles which are reinforced are provided with panels or gusset plates which are disposed inside the skeleton extending only between adjacent body frame members or elements and being connected thereto by rivets. This construction has been generally unsatisfactory because these reinforcements are no stronger than the riveted joints and permit appreciable relative movement between the body frame members.

In the present invention, these many internal panels and gusset plates are mostly eliminated and the skeleton frame of the body is reinforced by a band or strip means, or girder construction, which extends entirely around the front, rear and lateral sides of the body.

With reference to Figures 1 and 2, a girder, indicated at 47, extends around the outer side of the skeleton frame at a level adjacent the lower edges of the side window openings. Girder 47 may be a substantially integral strip or may comprise a series of individual strips connected end to end by a suitable riveted lap joint such as that at 48 to provide the equivalent of a single strip.

Girder 47 is interrupted only at the side doorways and at the rear motor compartment as illustrated in Figures 1 and 2 and where the girder as a reinforcing strip means is referred to in the claims as extending substantially entirely around the body this is intended to define a girder which is interrupted to provide for doorways or similar passages at the front, rear or sides of the vehicle body.

In its practical embodiment each strip or girder 47 is about eight inches wide and of suitable gauge and is rigidly secured as by welding to all of the vertical body frame members which it traverses. The individual strips may be of any desired length but this length is chosen so that no joint 48 will fall directly upon a frame member.

As illustrated in Figure 2, girder 47 extends along the frame entirely across the front end of the body below the window openings and is interrupted at the two side doorways 49 and 51 at the right side of the body. As illustrated in Figure 1, girder 47 extends across the rear of the body, being interrupted at the motor compartment opening, and then entirely along the left side of the body, being there interrupted only by the emergency rear doorway 52.

Figure 3:
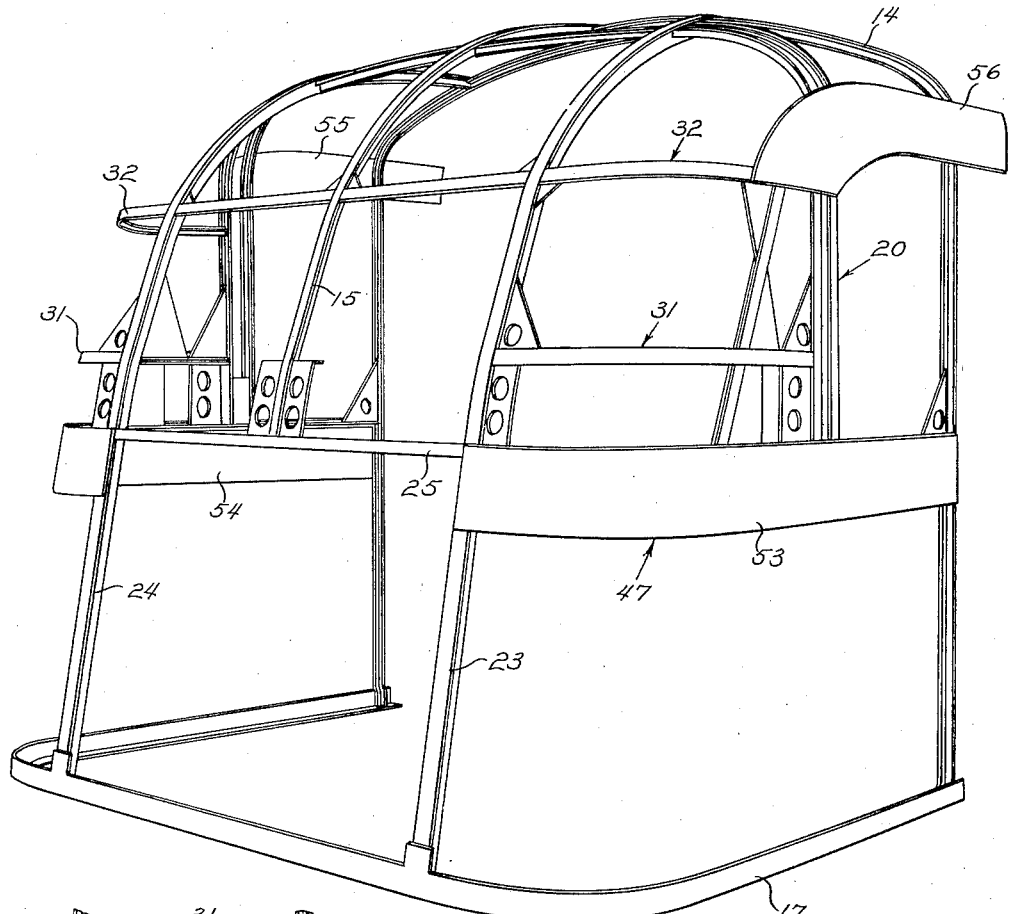
Figure 3 is a perspective of the rear end of a vehicle body frame constructed according to the invention with some of the body frame elements omitted to clearly illustrate the manner in which the reinforcing girders are mounted.
Figure 4:
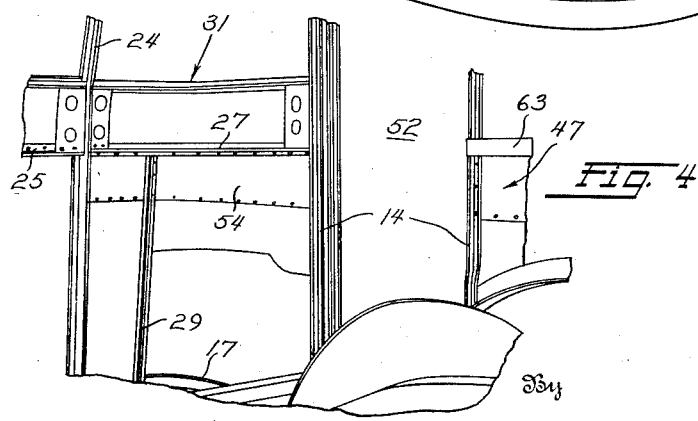
Figure 4 is perspective partial view of the interior of a rear corner of the vehicle body frame of the invention illustrating especially the lower reinforcing girder.

Figures 3 and 4 further illustrate the cooperation of girder 47 with the body frame and girder strips 53 and 54 are preferably integral strips.

At the upper edges of the side window openings, girders 55 and 56, which may be integral strips or a plurality of strips rigidly interconnected at adjacent ends, by lapped riveted joints such as indicated at 50 extend along opposite outer sides of the body skeleton and are rigidly secured thereto preferably by welding.

Each girder 55 and 56 is shaped to conform to the slope of the roof and side frame members and, at the rear of the body, slopes downwardly to terminate adjacent opposite ends of frame element 32 as illustrated in Figure 3.

Girder 55 is cut away at its lower edge to provide sufficient doorway height at doorway 51 and an additional reinforcing strip 57 is bridged between the vertical frame members 14 at opposite sides of that doorway.

At the front end of the body girders 55 and 56 curve inwardly to conform to the body contour as defined by the skeleton frame and terminate adjacent the ends of frame members 38, 39, 43, and 44. If desired these frame member ends and the adjacent ends of girders 55 and 56 may be tied together by welding or riveting the same to suitable brackets 58 and 59 respectively at opposite corners of the body.

Referring now to Figure 6, girders 47 and 55 therein disclosed are strips of steel of suitable gauge. Girder 47 is preferably formed with longitudinal ribs 61 to strengthen it against lateral bending stresses and is lapped over the upper edge of the lower external body paneling 62. Paneling 62 is preferably riveted to the lower edges of girder 61 and to angle members 34 and angle 17.

The upper edge of girder 47 is lapped under the outer leg of an inverted channel strip 63 which extends along the body at the lower edges of the side windows and is formed at the window openings to serve as window ledges. Strip 63 is preferably riveted to girder 47 and secured as by welding to brackets 64 which are rigid with the vertical frame members 14 at each window opening. In addition to functioning as a window ledge, strip 63 materially assists in strengthening the body frame longitudinally.

Suitable operable windows of conventional design indicated at 65 are provided in each window opening and such will not be further described since the present invention is not concerned with the details of the window construction.

Above the window openings girder 55 is formed at its lower edge to extend outwardly and downwardly at 66 to provide a water shed for the window below. The external roof paneling 67 is riveted in overlapped relation to the upper edge of girder 55 and adjacent its lower edge girder 55 is secured, as by welding, to horizontal frame elements 33 as above indicated. A resilient bed 68 for the upper window pane is securely clamped between the lower side of girder 55 and elements 33.

When steel strip girders are used as above described, or when material having the same desirable properties as steel is used in the girders, an appreciable saving in external body paneling material since the panels need only lap with the girders sufficiently to provide a suitable riveted joint and the girders in effect become substantial continuations of the body paneling.

It is possible to use the regular aluminum body paneling material for the strip material of the girders but in such instance the external body paneling is lapped wholly over the girders to double the thickness of the girders in order to gain sufficient rigidity. Such a construction illustrated in Figure 7 where the lower body paneling 62' is lapped in full surface engagement with the strip girder 47' and both are securely riveted together and to the window ledge channel 63. In this modification of the invention the rigid double strip thickness at the top of panel 62' functions to resist and uniformly distribute body stresses in the same manner as steel strip 47.

The above described invention provides an exceptionally rigid body frame which is reinforced by continuous girders extending substantially entirely around the body above and below the window openings.

These girders, being rigid with the body frame members and elements, distribute the operating stresses substantially uniformly along the body so that the individual frame members are not subjected to sudden, violent forces which tend to deform or rupture their connection with the other parts of the body. Each side of the body is effectively tied together and both ends are appreciably reinforced, the improvement over prior designs being especially noticeable in the body frame adjacent the motor support.

The above described invention also effects considerable economy in fabricating the vehicle bodies in that the numerous panels and gusset plates hitherto used at the interior of the frame are dispensed with and less external body paneling is needed. Moreover the appearance of the body, inside and out, is much neater and more pleasing to the eye than in prior constructions.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a vehicle body, a motor-supporting horizontal base frame having a pair of main longitudinal members and a plurality of spaced transverse members rigidly secured to said longitudinal members, each of said transverse members bridging said longitudinal members and terminating laterally outwardly thereof at opposite sides of said base frame; a plurality of vertical body frame members and means rigidly securing each of said vertical members to an adjacent end of one of said transverse members so that said vertical members are arranged in pairs at opposite ends of each transverse member and in longitudinal rows along opposite sides of said body; transverse roof frame members bridging the upper ends of said vertical members; a skirt member below said base frame interconnecting the lower ends of said vertical members; longitudinal frame members on opposite sides of said body cooperating with said vertical members to define side window openings in said body; and a reinforcing member comprising a relatively wide thin flat metal band extending substantially entirely around said body and being interrupted only at doorways and similar passages or openings in said body, said band being secured directly, intimately and rigidly upon the outer surfaces of the vertical frame members below said window openings so that stresses in said vertical frame members are communicated directly to said band, all of said members being integrally united to provide a light-weight, unitary, combined body and chassis skeleton frame to which the external body panels and the vehicle running gear are directly attached, with said band serving to resist and uniformly distribute twisting and bending stresses set up in said skeleton frame incident to motor vibration and uneven roadway conditions.

2. In the vehicle body defined in claim 1, a pair of wide thin flat bands secured directly and rigidly upon the outer surfaces of said vertical members along the upper edges of said side window openings at opposite sides of the body and extending parallel to said lower band.

3. In a vehicle body, a horizontal base frame comprising a plurality of rigidly interconnected longitudinal and transverse members; a plurality of substantially inverted U-shaped members of light structural metal spaced along and above said base frame, the opposed depending legs of each of said U-shaped members being secured to opposite ends of one of said transverse members; a skirt member interconnecting the lower ends of said legs below said base frame; longitudinal window ledge members secured to said legs along opposite sides of said body; a body reinforcing member comprising a relatively wide, thin, flat metal band extending substantially entirely around said body and being interrupted only at doorways and similar passages or openings in said body; means securing said band directly upon said legs and directly to said window ledge members, all of said members being united to provide a light-weight, unitary combined body and chassis skeleton frame to which the vehicle running gear is directly attached, with said band serving to resist and distribute twisting and bending stresses set up in said skeleton frame incident to motor vibration and uneven roadway conditions; and an external lower body panel secured upon said skeleton frame, the upper edge of said panel being lapped over said interrupted band so as to enclose said band between the body panel and said legs.

4. In a vehicle body, a unitary skeleton frame comprising a body base frame including a plurality of rigidly united longitudinal and transverse members and a series of substantially inverted U-shaped structural members spaced along and above said base frame, the opposed depending legs of each of said U-shaped members being secured to opposite ends of one of said transverse members; longitudinal window ledge members secured to said legs along opposite sides of said body, a body reinforcing member comprising a thin, flat, wide band of aluminum or like light metal extending substantially entirely around said skeleton frame and being interrupted only at doorways and similar passages or openings in said body, means securing said band directly to said window ledge members and to said legs along the exterior of said skeleton frame, and an external body panel of the same material as said band secured upon the exterior of said skeleton frame, the upper edge of said panel completely overlapping said band and being secured to said band and said window ledge member, and the combined thicknesses of said united band and panel at said overlapped portion providing a girder of appreciable strength for uniformly distributing operating forces among the skeleton frame members.

5. In a vehicle body, a unitary skeleton frame comprising a horizontal body base frame; a plurality of vertical members upstanding from opposite sides of said base frame, said vertical members being arranged in longitudinal rows along the sides of said body; longitudinal window ledge members secured to said vertical members along opposite sides of said body, each of said window ledge members comprising a structural beam having a depending outer leg; a body reinforcing member comprising a thin, flat band extending substantially entirely around said skeleton frame and secured directly to said vertical members said band being interrupted only at doorways and similar passages or openings in said body; an external body panel secured upon said skeleton frame below said beam, the upper end of said panel being wholly lapped over said band and disposed between said band and the inner side of said leg; and means rigidly uniting said leg, panel and band.

6. In a vehicle a light-weight, unitary skeleton frame comprising a body base frame and a plurality of vertical members upstanding from opposite sides of said base frame, said vertical members being arranged in longitudinal rows along opposite sides of said body; longitudinal window ledge members secured to said vertical members along opposite sides of said body; a thin relatively wide, flat band of steel or like rigid material extending substantially entirely around said body secured directly and rigidly upon said vertical members said band being interrupted only at doorways and similar passages or openings in said body; and an external body panel of aluminum or like light material secured upon said skeleton frame, the upper end of said panel underlapping the lower edge of said band so that the band comprises an effective upward continuation of the body panelling between said panel and the window ledge member.

WILLIAM B. FAGEOL